US007698269B2

(12) United States Patent
Zhou et al.

(10) Patent No.: US 7,698,269 B2
(45) Date of Patent: Apr. 13, 2010

(54) URL SHORTENING AND AUTHENTICATION WITH REVERSE HASH LOOKUP

(75) Inventors: Min Zhou, Palo Alto, CA (US); Zhaowei C Jiang, San Jose, CA (US); Michael J Temkin, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 314 days.

(21) Appl. No.: 11/288,596

(22) Filed: Nov. 29, 2005

(65) Prior Publication Data

US 2007/0136279 A1 Jun. 14, 2007

(51) Int. Cl.
*G06F 17/30* (2006.01)
(52) U.S. Cl. ............................ 707/6; 707/10; 707/101
(58) Field of Classification Search ............... 707/10, 707/102, 1, 6; 709/203
See application file for complete search history.

(56) References Cited

U.S. PATENT DOCUMENTS

| 5,446,916 | A  | * | 8/1995  | Derovanessian et al. | 709/236 |
|---|---|---|---|---|---|
| 5,530,757 | A  | * | 6/1996  | Krawczyk | 713/188 |
| 5,614,899 | A  | * | 3/1997  | Tokuda et al. | 341/51 |
| 5,673,043 | A  | * | 9/1997  | Hayashi et al. | 341/106 |
| 5,684,990 | A  | * | 11/1997 | Boothby | 707/203 |
| 5,813,007 | A  | * | 9/1998  | Nielsen | 707/10 |
| 5,933,606 | A  | * | 8/1999  | Mayhew | 709/239 |
| 5,977,969 | A  | * | 11/1999 | DiAngelo | 715/780 |
| 6,370,581 | B2 | * | 4/2002  | Rader | 709/230 |
| 6,397,259 | B1 | * | 5/2002  | Lincke et al. | 709/236 |
| 6,532,492 | B1 | * | 3/2003  | Presler-Marshall | 709/203 |
| 7,025,209 | B2 | * | 4/2006  | Hawkins | 709/203 |
| 7,146,429 | B2 | * | 12/2006 | Michel | 709/238 |
| 7,225,219 | B2 | * | 5/2007  | Giacomini et al. | 709/200 |
| 7,315,902 | B2 | * | 1/2008  | Kirkland | 707/4 |
| 2002/0026460 | A1 | * | 2/2002 | Dharap | 707/513 |
| 2002/0078027 | A1 | * | 6/2002 | Staring et al. | 707/1 |
| 2005/0169169 | A1 | * | 8/2005 | Gadde | 370/229 |
| 2005/0268341 | A1 | * | 12/2005 | Ross | 726/26 |
| 2006/0020807 | A1 | * | 1/2006 | Aura et al. | 713/176 |
| 2006/0173831 | A1 | * | 8/2006 | Basso et al. | 707/3 |
| 2006/0179071 | A1 | * | 8/2006 | Panigrahy et al. | 707/101 |
| 2006/0193159 | A1 | * | 8/2006 | Tan et al. | 365/49 |

(Continued)

OTHER PUBLICATIONS

Powell et. al., "The challenges of a wireless Web", Mar. 20, 2000, Network World Fusion, pp. 1-6.*

*Primary Examiner*—Charles Rones
*Assistant Examiner*—Rezwanul Mahmood
(74) *Attorney, Agent, or Firm*—Darby & Darby P.C.; Matthew M. Gaffney (57) ABSTRACT

A shortened identifier, such as a shortened URL, is used to access data, a service, and/or another resource that is associated with a full identifier, such as a full URL. In an exemplary embodiment, a hash key is generated from the full URL and included with a domain identifier to form a shortened URL. Other codes can also be included in the shortened URL. The shortened URL can be included in a message, page, and/or other data element that is generally too small for the full URL. When received from a client, a property code, a user ID, and/or other data is used to locate one or more full URLs. A selected hash function is applied to the full URLs to generate a table of hash keys. If a match exists with the hash key from the shortened URL, the resource is accessed at the corresponding full URL.

20 Claims, 4 Drawing Sheets

U.S. PATENT DOCUMENTS

2006/0208095 A1* 9/2006 Yamagajo et al. ............ 235/492
2006/0292292 A1* 12/2006 Brightman et al. ............ 427/66
2008/0243675 A1* 10/2008 Parsons et al. ................ 705/37

* cited by examiner

URL SHORTENING AND AUTHENTICATION WITH REVERSE HASH LOOKUP

FIELD OF ART

The present invention relates generally to accessing a resource, and more particularly, but not exclusively, to using a hash operation for mapping a shortened resource identifier to a full resource identifier for accessing the resource.

BACKGROUND

Data, services, and other resources are generally identified with a resource identifier such as a uniform resource locator (URL). For example, resource identifiers are often used to indicate a network location of email messages, alerts, application programs, and the like. Resource identifiers may also include query strings, settings, and/or other data. Consequently, resource identifiers can become rather large, and sometimes too large to include in certain types of data elements. For instance, some messages and web pages are limited in size, so they can be received, stored, and/or displayed on a limited capability device, such as a cell phone. To enable access to the resource, a shortened resource identifier can be used by the limited capability device and mapped to the full resource identifier.

A shortened resource identifier can be created by compressing the full resource identifier. When the shortened resource identifier is received, it is decompressed to determine the full resource identifier. However, the compression and decompression processes can cause loss of data, making the mapping unreliable. Also, the compression may not sufficiently reduce the size below the limits of the message or other data element. Another mapping may comprise a predefined database key that is stored in association with a full resource identifier. If the key is received, a database lookup is performed to find the corresponding resource identifier. However, storing a large number of keys and full resource identifiers may take an unacceptably large amount of storage space and require a large amount of maintenance. For security, the keys and/or the full resource identifiers may also need to be encrypted and decrypted, which adds time and consumes computing resources.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, aspects of the present invention are directed towards enabling access to a network resource that via a hash key in a shortened URL. Although the invention is not so limited, an exemplary embodiment is described below in terms of communicating a shortened URL from a mobile device to a server that determines a corresponding full URL and directs an access request to the full URL.

Illustrative Operating Environment

Figure 1:
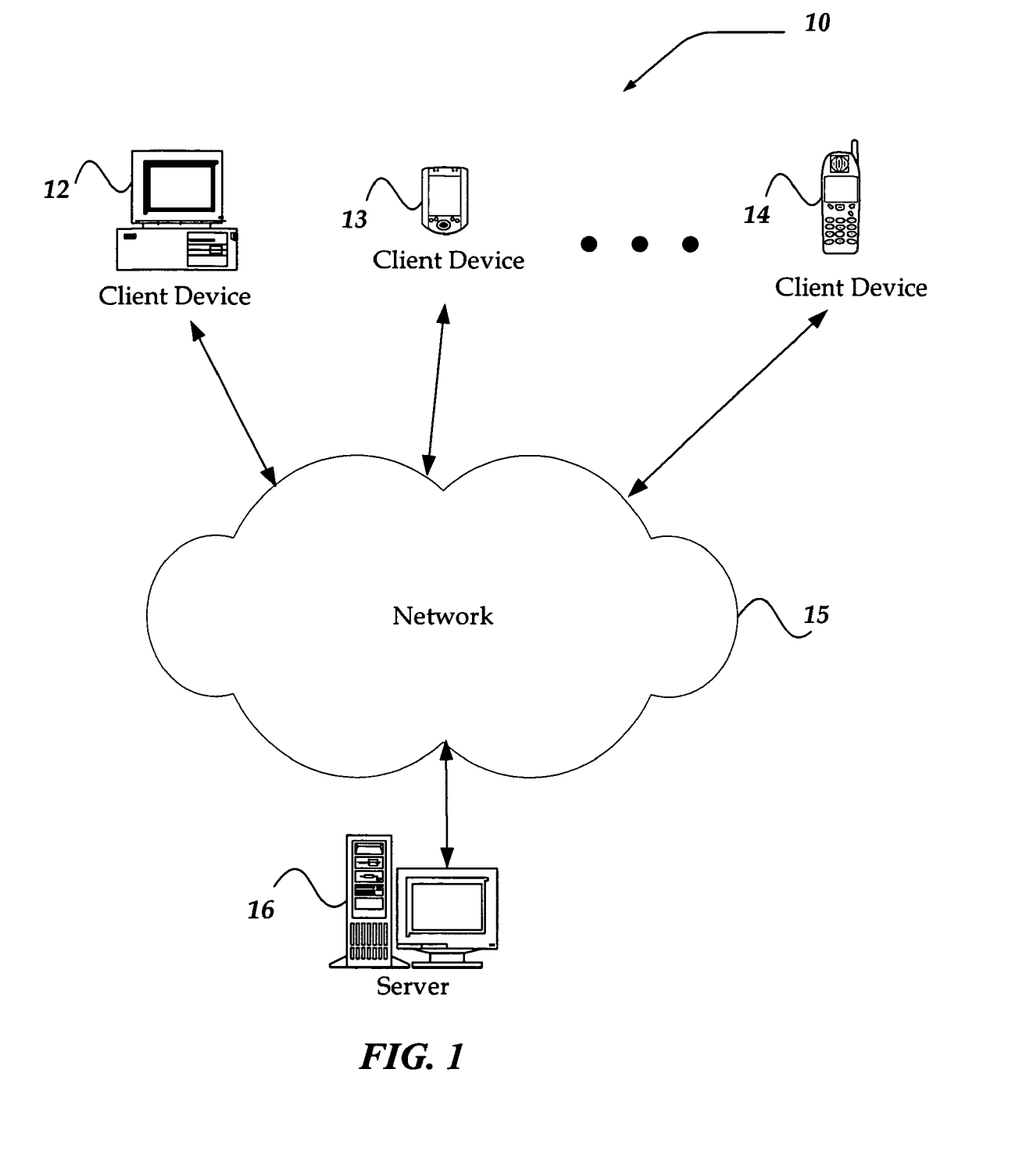
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, and one or more servers, such as a server 16. Network 15 is in communication with and enables communication between each of client devices 12-14 and server 16. The server generally controls access to services, and may include the services. Services may include a portal service, a search service, a messaging service, an alert service, and/or other services.

Client devices 12-14 may include virtually any computing device capable of receiving and sending a message over a network, such as network 15, to and from another computing device, such as server 16, each other, and the like. The set of such devices may include devices that are usually considered limited capability devices or specialized devices, such as mobile devices that typically connect using a wireless communications medium such as cell phones, smart phones, pagers, walkie talkies, radio frequency (RF) devices, infrared (IR) devices, CBs, navigation devices, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, networked home appliances, and any other device that is equipped to communicate over a wired and/or wireless communication medium. The set of such devices may also include devices that are usually considered general purpose devices and often connect using a wired communications medium such as personal computers, multiprocessor systems, microprocessor-based or programmable consumer electronics, network PCs, and the like.

Each client device within client devices 12-14 includes a user interface that typically enables a user to control settings, and to instruct the client device to perform operations. Each client device also includes a communication interface that enables the client device to send and receive messages from another computing device employing the same or a different communication mode, including, but not limited to short message service (SMS) messaging, multi-media message service (MMS) messaging, email, instant messaging (IM), internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible HyperText Markup Language (xHTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as an Internet interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, and/or server 16. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Exemplary Computing Environment

Figure 2:
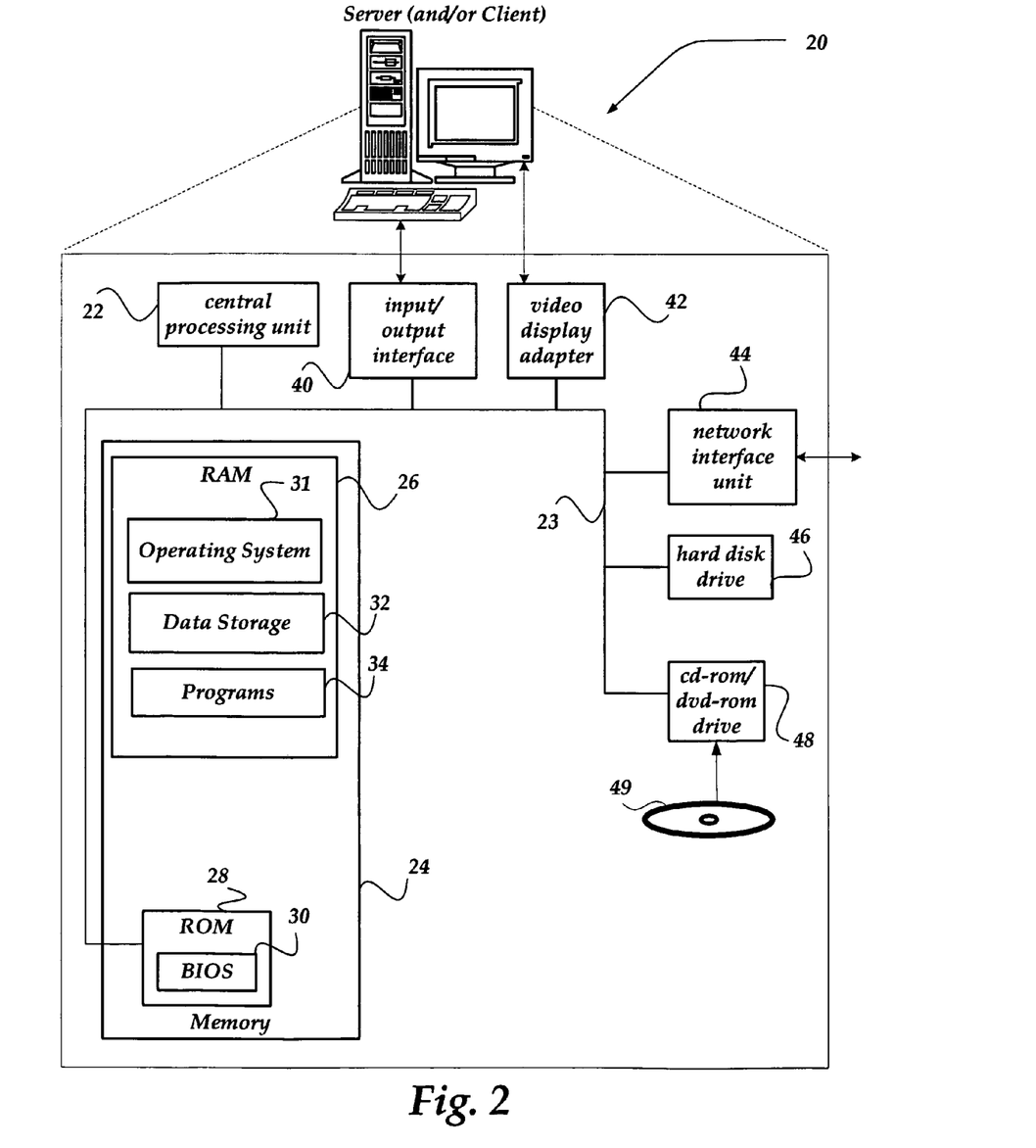
FIG. 2 shows one embodiment of a computing device that may be included in a system implementing the invention.

FIG. 2 shows one embodiment of a server device 20 that may be included in a system implementing the invention. Server device 20 may include many more or less components than those shown. However, the components shown are sufficient to disclose an illustrative embodiment for practicing the present invention. In this sample embodiment, server device 20 is generally configured as a general purpose computer. However, a dedicated device, a client device, a mobile device, and/or other device may be used in a centralized or distributed manner. Briefly, server device 20 may include any computing device capable of connecting to network 15 to enable a user to communicate with other devices. Server device 20 may or may not be combined with, in communication with, or otherwise associated with portal services, messaging services, news services, financial services, search services, and/or other services or data. Many of the components of server device 20 may also be duplicated in a server of any such services and/or in client devices.

As shown in the figure, server device 20 includes a processing unit 22 in communication with a mass memory 24 via a bus 23. Mass memory 24 generally includes a RAM 26, a ROM 28, and other storage means. Mass memory 24 also illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of server device 20. The mass memory also stores an operating system 31 for controlling the operation of server device 20. It will be appreciated that this component may include a general purpose operating system such as a version of Windows®, UNIX, LINUX®, or the like. The operating system may also include, or interface with a virtual machine module that enables control of hardware components and/or operating system operations via application programs.

Mass memory 24 further includes one or more data storage units 32, which can be utilized by server device 20 to store, among other things, data for programs 34 and/or other data. Programs 34 may include computer executable instructions which can be executed by server device 20 to implement application programs including schedulers, calendars, web services, transcoders, database programs, word processing programs, spreadsheet programs, and so forth. Accordingly, programs 34 can process data communications, web pages, audio, video, and enable telecommunication with other electronic devices.

In addition, mass memory 24 may store one or more programs for authorizing user access, messaging, gaming and/or other applications. An example may be a messaging module that may include computer executable instructions, which may be run under control of operating system 31 to enable email, SMS, MMS, instant messaging, and/or other messaging services. Similarly, server device 20 may provide routing, access control, and/or other server-side messaging services. Server device 20 may further include a portal server, which provides portal services, including searching services, news services, messaging services, shopping services, social networking services, mapping services, and the like. A server device configured much like server device 20 (and/or server device 20 itself) may include a monitoring module (not shown) that monitors activity of online services.

Server device 20 also includes an input/output interface 40 for communicating with input/output devices such as a keyboard, mouse, wheel, joy stick, rocker switches, keypad, printer, scanner, and/or other input devices not specifically shown in FIG. 2. A user of server device 20 can use input/output devices to interact with a user interface that may be separate or integrated with operating system 31 and/or programs 34-38. Interaction with the user interface includes visual interaction via a display, and a video display adapter 42.

Server device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 244, server device 20 can communicate with a wide area network such as the Internet, a local area network, a wired telephone network, a cellular telephone network, and/or some other communications network, such as network 15 in FIG. 1. Network communication interface unit 44 is sometimes known as a transceiver, transceiving device, network interface card (NIC), and the like.

Exemplary Architecture

Figure 3:
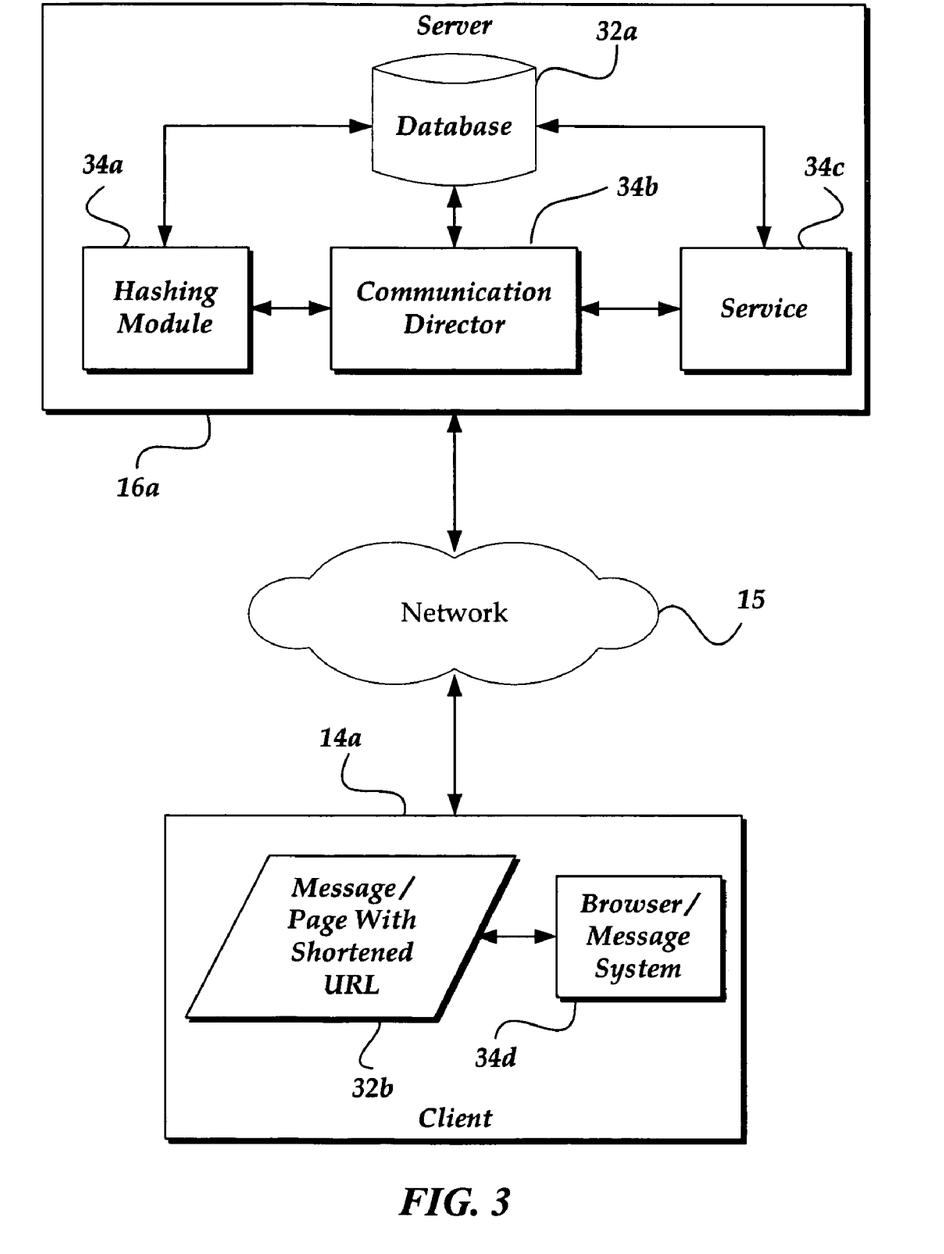
FIG. 3 illustrates one embodiment of an architecture for implementing an embodiment of the present invention.

FIG. 3 illustrates one embodiment of an architecture for practicing the present invention. However, not all of the illustrated modules may be required to practice the invention, and variations in the arrangement and type of the components may be made without departing from the spirit or scope of the invention.

A server 16a may comprise a content server and/or an intermediary network node. For example, server 16a may be a mobile switch redirector that redirects requests to content servers. As illustrated, server 16a includes a number of modules that may communicate with each other. A database 32a generally stores various types of data, including news data, search data, and the like. The data may be used by one or more services 34c, such as internet searching services, messaging services, news services, and the like. Other data may include data associated with users, such as user identifiers (IDs), preference settings, email messages stored for individual users, links stored for individual users, and the like. In communication with database 32a is service 34c, a communication director 34b, a hashing module 34a, and/or other modules. Hashing module 34a generally performs hash operations such as selecting and executing hash functions on URLs and/or other data. Communication director 34b generally routes requests and responses among modules of server 16a, other servers, and clients.

As shown, server 16a communicates through network 15 with a client 14a. In an exemplary embodiment, client 14a comprise a mobile node. Client 14a generally includes a browser and/or message system, which processes a page or message 32b with a shortened URL. The browser or message system may support pages or messages of limited size, such as SMS messages. For some clients, pages or messages may be limited to 120-512 bytes. Limited-size pages or messages may be too small to include a full URL, which may be approximately 1000 bytes. However, a shortened URL is provided to fit within the limitations of pages or messages of limited size.

Exemplary Logic

Figure 4:
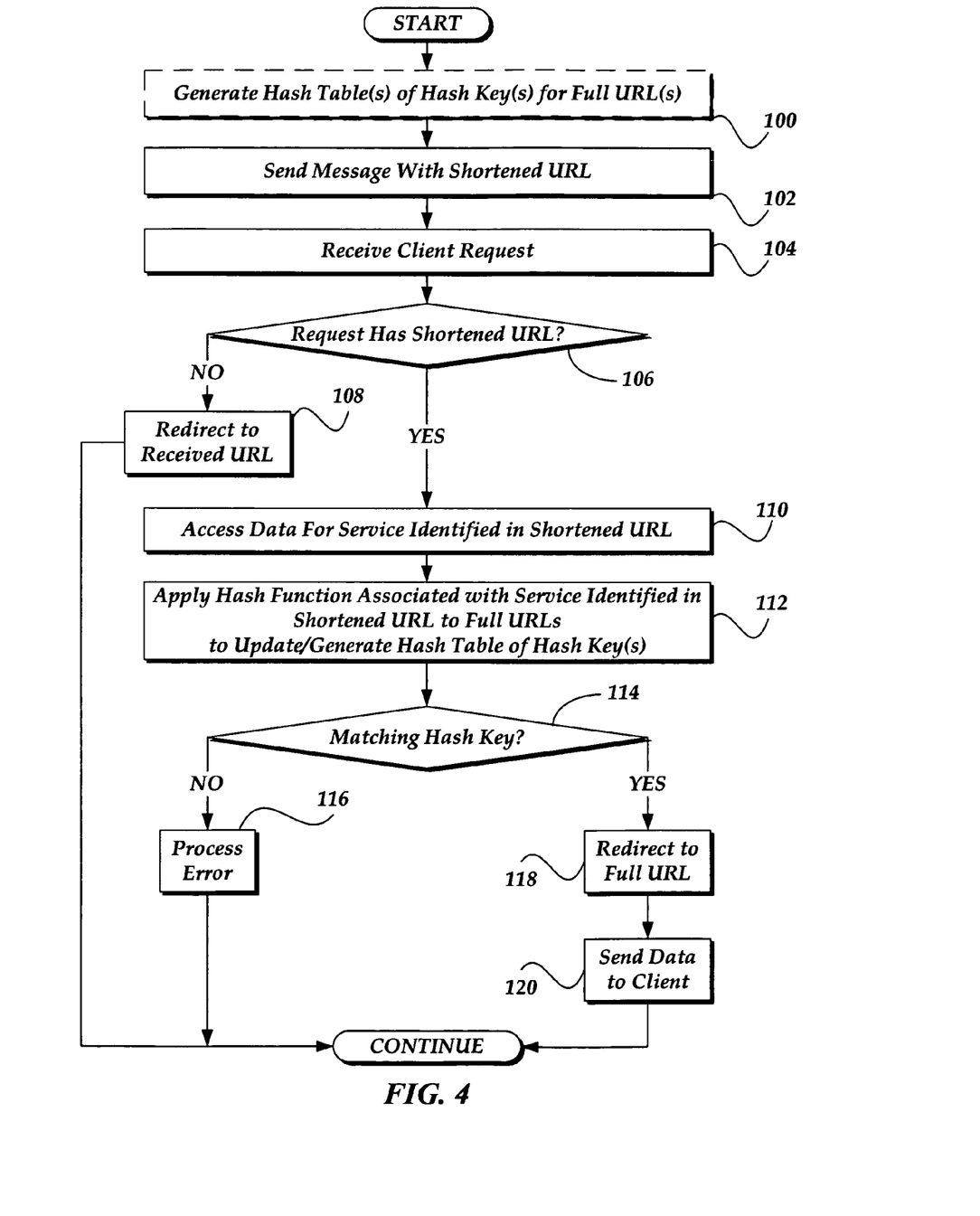
FIG. 4 is a flow diagram illustrating exemplary logic for one embodiment of the invention.

FIG. 4 illustrates one embodiment of exemplary logic for accessing a full URL via a shortened URL. At an operation 100, the hashing module may optionally check for full URLs that are associated with a user and/or with particular services, such as an internet search service, news services, auction services, instant messaging services, alert services, and the like. Services are sometimes referred to as properties, such as a news property, an auction property, a messaging property, an alert property, and the like. The hashing module applies a hash function to each full URL, or a portion of each full URL, to generate a corresponding hash key. A full URL may include a complex path, a query string, and/or other elements. For example, a full URL may identify a search result that the user wishes to clip and send to a mobile device. Another example may be one of many email messages stored by a particular messaging service, in a particular database table of a particular server, for a particular user. The hashing module applies a selected hash function to at least a portion of the complex URL string, creating a hash key. The hashing module may apply a different hash function (or series of hash functions) for each service, each user identifier, and/or other characteristic. Such characteristics may also be used as parameters of the hash function. The full URLs and hash keys may be mapped in one or more hash tables for future reference. Service identifiers, user identifiers, sign-in status, and/or other data may also be included in the hash table(s) for quicker searching, validating requests, and/or other uses of the hash table(s). URL additions, deletions, or other changes may be propagated to the hash tables as such changes occur, or may be delayed until a request is made through a shortened URL. The tables may be stored temporarily during a session, for a predefined period, or permanently. Alternatively, one or more hash keys can be generated on the fly and not stored.

At an operation 102, a shortened URL is created and sent in a Web page, an SMS message, or other message to a client. For example, an alert may be sent to a mobile node when a new email message arrives at an online email service. A validation of the user identifier, sign-in status, and/or other characteristics may be performed to ensure the shortened URL is permitted in the alert, page, or other message. The shortened URL generally includes a hash key of the full URL. The shortened URL may also include a property code that may indicate the type of service with which the full URL is associated. A sub-property code and/or other codes may also be included. For instance, an action code may indicate an operation that a service or application should perform. A domain name in the shortened URL will generally refer to a network address of the communication director for evaluation and redirection to the full URL. A sample structure of a shortened URL is as follows:

http://domain_name/property_code/hash_key

Shortened URLs generally use fewer bytes than a corresponding full URL. For example, a shortened URL may use approximately 30 bytes, although some may use less and some may use more. These shortened URLs will generally fit well within size limitations of WAP browser pages, SMS messages, and/or other client communications. The shortened URL is generally displayed on the client device and can be selected by a user as a hyperlink. The shortened URL is then communicated to the communication director, which may or may not reside on the same server as the corresponding service.

In general, the communication director receives a client request at an operation 104. At a decision operation 106, the communication director determines whether the client request includes a URL in a predefined format of a shortened URL. If the received client request does not include a shortened URL, but includes some sort of URL, the communication director redirects the request to the address of the received URL for further processing at an operation 108. However, if a shortened URL is recognizes in the received client request, the communication director extracts the property code and/or other information from the shortened URL. The communication director may also determine a user identifier, a client identifier and/or other information from a header, a cookie, and/or other aspect of the received client request. Using the information extracted from the received client request and the shortened URL, the communication director checks for corresponding hash table(s) at an operation 110. If no corresponding hash table(s) exist, or if the table(s) need to be updated, the communication director instructs the hashing module to accesses full URLs corresponding to the extracted information. For example, the communication director may use the user identifier from the header and the property code from the shortened URL to instruct the hashing module to access or determine corresponding full URLs of the user's email messages for an online email system. A validation of the user identifier, sign-in status, and/or other characteristics may also be performed to ensure access is allowed to the hash table(s), full URLs, other data and/or other services.

At an operation 112, the communication director evaluates the hash keys in the existing hash table(s). Alternatively, the hashing module applies the hash function to the full URLs in real time to update the corresponding hash table(s) or to generate the hash table(s) of hash keys. At a decision operation 114, the communication director compares the hash key from the received shortened URL with the hash key(s) of the hash table(s). The communication director may also perform a validation of the user identifier, sing-in status, and/or other characteristics that may be compared between the hash table(s) and the request received from the client. If no match is found, and/or validation can not be confirmed, the communication director performs some error processing at an operation 116. However, if a match is found, the communication director redirects the client to the corresponding full URL at an operation 118. A service is performed and/or data associated with the full URL is then returned to the client.

The above specification, examples, and data provide a complete description of the manufacture and use of the composition of the invention. However other embodiments will be clear to one skilled in the art. Since many embodiments of the invention can be made without departing from the spirit and scope of the invention, the invention resides in the claims hereinafter appended.

What is claimed as new and desired to be protected by Letters Patent of the United States is:

1. An article of manufacture including a processor-readable storage medium having processor-executable code encoded therein, which when executed by one or more processors, enables actions for enabling access to a resource, comprising:
    applying a hash operation to at least a portion of a full identifier of the resource, producing a hash key;
    detecting that a message includes a shortened identifier selectively indicated by a user to request the resource, wherein the shortened identifier is in a predefined format, and is smaller than the full identifier;
    comparing the hash key to a portion of the shortened identifier, wherein the portion of the shortened identifier is arranged to include at least one hash key and another portion of the shortened identifier includes a code for handling access to the resource of a plurality of codes for handling access to the resource; and
    determining that the shortened identifier identifies the resource if the hash key matches the portion of the shortened identifier that includes the at least one hash key, wherein each different code for handling access to the resource of the plurality of codes for handling access to the resource has a corresponding different hash operation for generating the hash key from the full identifier.

2. The article of manufacture of claim 1, the actions further comprising:
    creating the shortened identifier based at least in part on a domain associated with the resource and on the hash key; and
    communicating the shortened identifier to a network node.

3. The article of manufacture of claim 1, the actions further comprising:
    receiving the shortened identifier from a network node; and
    directing the network node to the resource based on the full identifier.

4. The article of manufacture of claim 1, wherein the full identifier comprises a uniform resource locator (URL).

5. The article of manufacture of claim 1, the actions further comprising accessing the full identifier based at least in part on one of the following: a service identifier and a user identifier.

6. The article of manufacture of claim 1, wherein the hash operation is selected from a plurality of hash operations, each hash operation being associated at least in part with a particular service.

7. A server device for enabling access to a resource, comprising:
    a memory for storing instructions and data; and
    a processor in communication with the memory, wherein the processor performs actions based at least in part on the stored instructions, including:
    applying a hash operation to at least a portion of a full identifier of the resource, producing a hash key;
    detecting that a message includes a shortened identifier selectively indicated by a user to request the resource, wherein the shortened identifier is in a predefined format, and is smaller than the full identifier;
    comparing the hash key to a portion of the shortened identifier, wherein the portion of the shortened identifier is arranged to include at least one hash key and another portion of the shortened identifier includes a code for handling access to the resource of a plurality of codes for handling access to the resource; and
    determining that the shortened identifier identifies the resource if the hash key matches the portion of the shortened identifier that includes the at least one hash key, wherein each different code for handling access to the resource of the plurality of codes for handling access to the resource has a corresponding different hash operation for generating the hash key from the full identifier.

8. The server device of claim 7, further comprising a communication interface in communication with the processor and with a client, and wherein the processor further performs the actions of:
creating the shortened identifier based at least in part on a domain associated with the resource and on the hash key; and
communicating the shortened identifier to a network node.

9. The server device of claim 7, further comprising a communication interface in communication with the processor and with a client, and wherein the processor further performs the actions of:
receiving the shortened identifier from a network node; and
directing the network node to the resource based on the full identifier.

10. The server device of claim 7, wherein the full identifier comprises a uniform resource locator (URL).

11. The server device of claim 7, wherein the processor further performs the action of accessing the full identifier based at least in part on at least one of the following: a service identifier and a user identifier.

12. The server device of claim 7, wherein the hash operation is selected from a plurality of hash operations, each hash operation being associated at least in part with a particular service.

13. An article of manufacture including a processor-readable storage medium having processor-executable code encoded therein, which when executed by one or more processors, enables actions for accessing a resource, comprising:
enabling a user to indicate a shortened identifier, wherein the shortened identifier is in a predefined format, and wherein a portion of the shortened identifier is arranged to include at least one hash key and another portion of the shortened identifier includes a code for handling access to the resource of a plurality of codes for handling access to the resource;
communicating the shortened identifier to a communication director for comparing the hash key to a result of a hash operation applied to a full identifier of the resource; and accessing the resource if the hash key matches the result of the hash operation, wherein each different code for handling access to the resource of the plurality of codes for handling access to the resource has a corresponding different hash operation for generating the hash key from the full identifier.

14. The article of manufacture of claim 13, the actions further comprising storing the shortened identifier within a data element that is sized smaller than a storage size of the full identifier.

15. The article of manufacture of claim 13, the actions further comprising communicating to the communication director a code for use at least in part to locate the full identifier.

16. The article of manufacture of claim 13, wherein the shortened identifier includes a code for identifying one of a plurality of hash operations to apply to the full identifier of the resource.

17. A client device for accessing a resource comprising:
a user interface;
a communication interface in communication with a client communication director;
a memory for storing instructions and data; and
a processor in communication with the communication interface, with the user interface, and with the memory, wherein the processor performs actions based at least in part on the stored instructions, including:
enabling a user to indicate a shortened identifier through the user interface, wherein the shortened identifier is in a predefined format, and wherein a portion of the shortened identifier is arranged to include at least one hash key and another portion of the shortened identifier includes a code for handling access to the resource of a plurality of codes for handling access to the resource;
communicating the shortened identifier in a resource request message to a communication director for comparing the hash key to a result of a hash operation applied to a full identifier of the resource, wherein the shortened identifier is smaller than the full identifier, and wherein the portion of the shortened identifier is a part of the shortened identifier; and
accessing the resource if the hash key matches the result of the hash operation, wherein each different code for handling access to the resource of the plurality of codes for handling access to the resource has a corresponding different hash operation for generating the hash key from the full identifier.

18. The client device of claim 17, wherein the processor further performs the action of storing the shortened identifier within a data element that is sized smaller than a storage size of the full identifier.

19. The client device of claim 17, wherein the processor further performs the action of communicating to the communication director a code for use at least in part to locate the full identifier.

20. The client device of claim 17, wherein the client device comprises a mobile device.

* * * * *